3,772,355
PROCESS FOR THE MANUFACTURE OF
TERTIARY BUTYLATES
Juerg Merz, Therwil, Switzerland, assignor to Ciba-Geigy
AG, Basel, Switzerland
No Drawing. Filed Aug. 6, 1971, Ser. No. 169,837
Claims priority, application Switzerland, Aug. 11, 1970,
12,030/70
Int. Cl. C07f 7/00, 9/00, 11/00
U.S. Cl. 260—429 R
9 Claims

ABSTRACT OF THE DISCLOSURE

A process for the manufacture of metal tertiary butylates is provided. Metal alcoholates of metals of the Subgroups IVb, Vb or VIb of the Periodic System of Elements are reacted with an excess of tertiary butanol at reflux temperature of the reaction mixture and the solvent is slowly distilled of simultaneously or only after a certain time of refluxing or in portions during the whole reaction time.

The metal tertiary butylates obtained are known crosslinking curing and polymerisation catalysts.

---

The subject of the invention is a process for the manufacture of tertiary butylates of metals of Groups IVb, Vb or VIb of the Periodic System, characterised in that 1 mol of a metal alcoholate of the formula (1)  $Me(O-R)_n$ wherein Me denotes a n-valent metal of groups IVb, Vb or VIb of the periodic system, R denotes an alkyl radical with 1 to 3 carbon atoms and n denotes 4, 5 or 6, together with at least 20n mols of tertiary butanol, optionally in the presence of cyclohexane, is warmed to the reflux temperature of the reaction mixture, the solvent is slowly distilled off, and finally all volatile constituents are removed, in vacuo if necessary. The Groups IVb to VIb are those according to Lange's Handbook of Chemistry, 10th ed., pp. 60 and 61 (McGraw-Hill Book Co. Inc. 1967).

In detail, the procedure followed is, as a rule, that (a) the reaction mixture is slowly warmed to the reflux temperature and slow distilling off of the solvents is started immediately, or (b) the reaction mixture is warmed to the reflux temperature for a certain time, for example 1 to 8 hours, and slow distilling off of the solvents is only started then, or (c) the same procedure as under (b) is followed, but the solvents are distilled off in portions.

In all three embodiments, all volatile constituents which are still present, such as residues of the alkanol HO—R, tertiary butanol and, where relevant, cyclohexane, are removed finally, preferably by distillation in vacuo.

It is always important that all process stages should take place under mild conditions. An addition of cyclohexane to the reaction mixture, in particular, permits distillation under very mild conditions. During warming, care must always be taken that there should not be an excessively great gradient between the internal temperature of the reaction mixture and the external temperature, for example of the oil bath, so that local overheating is avoidable. Preferably, the reflux temperature should be at most 120° C.

Further, the reaction is advantageously carried out with exclusion of atmospheric moisture, appropriately in a protective gas atmosphere, for example in a nitrogen atmosphere.

The preferred starting material used is a metal alcoholate of the formula (2)  $Me(O-R_1)_n$ wherein $R_1$ denotes an ethyl or especially a methyl radical and Me and n have the indicated meaning.

Metal alcoholates of the formula (3)  $Me_1(O-R)_n$ wherein $Me_1$ denotes niobium$^V$, tantalum$^V$, tungsten$^{VI}$, molybdenum$^{VI}$ or hafnium$^{IV}$, and n denotes 4, 5 or 6, in accordance with the valency of the metal, and R has the indicated meaning, are also particularly suitable.

Here, metal alcoholates of the formula (4)  $Me_2(O-R_1)_{n_1}$ wherein $Me_2$ denotes niobium$^V$, tantalum$^V$ or tungsten$^{VI}$, $n_1$ denotes 5 or 6, corresponding to the valency of the metal, and $R_1$ denotes ethyl or especially methyl, are of particular interest.

In addition to the metal alcoholates just mentioned, corresponding alcoholates of titanium$^{IV}$, zirconium$^{IV}$, vanadium$^V$ or chromium$^{VI}$ can also be used.

It is important for the success of the process according to the invention that the tertiary butanol should be employed in at least 20 times the equivalent amount, relative to the metal alcoholate, that is to say that per 1 mol of the compound of the Formulae 1 to 4 at least 20n, preferably 20n to 80n, or $20n_1$ to $80n_1$, mols of tertiary butanol should be employed. As a rule, an amount of 20n to 40n, or $20n_1$ to $40n_1$, mols of tertiary butanol even suffices.

All references to the periodic system concern the periodic system according to Mendelejeff.

The metal alcoholates used as starting materials, for example the appropriate methylate, ethylate or isopropylate, can be manufactured according to methods which are in themselves known, for example by reaction of the corresponding metal chloride with an alkali alkoxide:

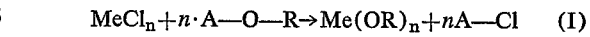

$MeCl_n + n \cdot A—O—R \rightarrow Me(OR)_n + nA—Cl$  (I)

Me, R and n here have the indicated meaning and A represents an alkali metal atom.

Another method is that the corresponding metal chloride is reacted with an alkanol and ammonia:

$MeCl_n + n \cdot R—OH + n \cdot NH_3 \rightarrow Me(OR)_n + nNH_4Cl$  (II)

here, Me, R and n again have the indicated meaning.

Tertiary butylates cannot be manufactured directly according to these methods [Nature 164, 710 ff. (1949)].

The process according to the invention has the advantage, over known processes, that it is simple and cheap and that it additionally provides extremely favourable yields, in part of over 90% of theory. If the yield over both stages, that is to say from the metal chloride via the metal alcoholate Me(OR)$_n$ to the metal tertiary butylate, is calculated, a very good yield still results, in part of above 80% of theory, regardless of whether the metal alcoholate is manufactured according to the reaction (I) or (II).

In the involved known processes which, for example, take place in accordance with the equation:

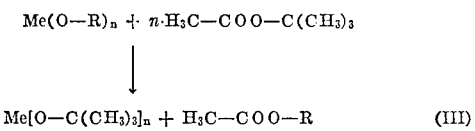

$$Me[O-C(CH_3)_3]_n + H_3C-COO-R \quad (III)$$

wherein Me, R and $n$ have the indicated meaning, such high yields are never obtained, since, in order to manufacture the tertiary butyl ester of acetic acid, it is necessary to start from acetyl chloride, in the manufacture of which the yield is already only about 50% of theory [Org. Synthesis, volume II, 1942 (1955)].

The metal tertiary butylates obtained according to the process of the invention precipitate in a crystalline form after removal of the excess tertiary butanol and can be dried easily by removing the last volatile constituents in vacuo. These metal alcoholates are distinguished by good purity, so that they can be used directly without additional purification.

The metal tertiary butylates manufactured according to the invention, and their use, are known. They are, for example, suitable for the crosslinking and curing of synthetic resins for lacquers, for example alkyd resins, epoxide resins or terephthalate resins. They are furthermore employed as binders for corrosion-resistant high temperature lacquers. In particular, however, they are used for improving the quality of metal and glass articles, above all for improving the scratch resistance and resistance to fracture. Furthermore, they serve as catalyst in the polymerisation of olefines or in the esterification of phthalate, adipate and polyester plasticisers.

EXAMPLE 1

40.6 g. (0.1 mol) of Ta(—$OC_2H_5$)$_5$ are introduced into 1480 g. (20 mols) of tertiary butanol (anhydrous) and the mixture is reacted under reflux at 81° C. for 2 hours, during which time the temperature of the oil bath used for heating does not exceed 110° C. After one hour a first portion of solvent of 165 g. is distilled off at 81° C., the oil bath temperature remaining the same. A second, third and fourth portion are distilled off at 82° C. (oil bath 115° C.) after 1, 2 and 3 hours, respectively. The distillation of a portion requires above one hour. To prevent reaction of the metal alcoholate with water (atmospheric moisture) to give Me(OH)$_n$, the reaction is carried out under a nitrogen atmosphere. Thereafter, a part of the tertiary butanol is distilled off over the course of 2½ hours at 120° C. oil bath temperature. The remaining solvent is removed in vacuo over the course of 3 hours at 50° C. (oil bath 100° C.). The distillation is again carried out in a nitrogen atomsphere.

50 g. of a crystalline white powder are obtained, corresponding to a yield of 91.5% of theory. The melting point of the hygroscopic compound is 90° C.

*Analysis.*—Calcd. for Ta(—O—C(CH$_3$)$_3$)$_5$ (percent): C, 43.9; H, 8.3. Found (percent): C, 41; H, 8.1.

EXAMPLE 2

20.3 g. (0.05 mol) of Ta(OC$_2$H$_5$)$_5$, 740 g. (10 mols) of tertiary butanol (anhydrous) and 1260 g. of cyclohexane are together warmed to 72° C. (oil bath 100° C.) under reflux in a nitrogen atmosphere, for 2 hours. Thereafter, 4 portions of 165 g. of solvent are distilled off over the course of 3 hours at 72° C. (oil bath 100°). The solvents are subsequently distilled off for 3 hours at 72 to 80° C., and finally the reaction product is dried in vacuo for 3 hours at 60° C. (oil bath 100° C.). Again, the reaction is carried out under a nitrogen atmosphere in order to avoid atmospheric moisture.

The yield is 26 g. or 45% of theory. The hygroscopic product melts at 85° C. and gives the following analysis:

Calcd. for Ta(—O—C(CH$_3$)$_3$)$_5$ (percent): C, 43.9; H, 8.3. Found (percent): C, 42.2; H, 8.5.

EXAMPLE 3

40 g. (0.1 mol) of W(OCH$_3$)$_6$ are introduced into 950 g. (12 mols) of tertiary butanol (anhydrous) and warmed at 81° C. (oil bath 95° C.) for 2 hours under reflux in a nitrogen atmosphere. Thereafter the excess tertiary butanol is distilled off at 81° C. (oil bath 110° C.), requiring 4 hours. The reaction product is freed of residual solvent over the course of one hour at 32° C. and under a vacuum of 11 mm. Hg. The reaction and the distillation are again carried out in a nitrogen atmosphere in order to avoid a reaction with atmospheric moisture.

The yield is 50 g. or 80% of theory and the melting point of the tungsten hexa-tertiary butylate is about —15° C.

EXAMPLE 4

47.6 g. (0.1 mol) of Ta(O—CH(CH$_3$)$_2$) are introduced into 1480 g. (10 mols) of tertiary butanol (anhydrous) and the mixture is warmed to 81° C. (oil bath 120° C.) for 2 hours under reflux in a nitrogen atmosphere. 4 portions of 165 g. of the alcohol mixture are then distilled off over the course of 3 hours at the same temperature (81° C.). The remainder of the volatile constituents is removed over the course of 2 hours at normal pressure under nitrogen at 80 to 82° C. (oil bath 120° C.) and subsequently over the course of 1 to 2 hours in vacuo at 30 to 50° C. (oil bath 100° C.).

The yield is 43 g. or 90% of theory. The melting point of the hygroscopic compound is 130° C.

EXAMPLE 5

31.8 g. (0.1 mol) of Nb(—OC$_2$H$_5$)$_5$ together with 814 g. (11 mols) of tertiary butanol (anhydrous) and 1600 ml. of anhydrous cyclohexane are warmed for 3 hours at 70° C. (oil bath 95° C.) under reflux in a nitrogen atmosphere. Thereafter the solvents are continuously distilled off over the course of 3 hours at 71 to 80° C. (oil bath 95 to 120° C.). The remainder of the volatile constituents is removed over the course of 2½ hours at 60 to 80° C. (oil bath 100° C.) in vacuo. This distillation is also carried out in a nitrogen atmosphere, with exclusion of atmospheric moisture.

A pale yellow-coloured powder of melting point 107° C. is obtained in a yield of 41 g. or 89.5% of theory. The analysis of the very hygroscopic product shows:

Calcd. for Nb(—O—C(CH$_3$)$_3$)$_5$ (percent): C, 52.4; H, 9.9. Found (percent): C, 50.2; H, 9.7.

EXAMPLE 6

24.8 g. (0.1 mol) of Nb—(OCH$_3$)$_5$ and 1480 g. (11 mols) of tertiary butanol (anhydrous) are together warmed to 80° C. (oil bath 120° C.) under reflux in a nitrogen atmosphere for 2 hours. Thereafter 4 portions of 165 g. of solvent are distilled off at the same temperature over the course of 3 hours. The residual volatile constituents are then removed over the course of 2½ hours at 81° C. under normal pressure, and finally in vacuo at 40° C., whilst excluding atmospheric moisture.

A white powder of Nb—(O—C(CH$_3$)$_3$)$_5$, of melting point 175° C., is obtained in a yield of 41 g. or 89.5% of theory.

EXAMPLE 7

19.41 g. (0.05 mol) of Nb—(OCH(CH$_3$)$_2$)$_5$ and 740 g. (10 mols) of tertiary butanol (anhydrous) are together heated to 85° C. (oil bath 120° C.) under reflux in a nitrogen atmosphere for 3 hours. Thereafter, 4 portions of 165 g. of volatile constituents are distilled off at 83° C. (oil bath 115° C.) over the course of about 4 hours. The residual volatile constituents are then removed over the course of 1½ hours, with exclusion of atmospheric moisture, at 83° C. and under normal pressure, and finally at 30 to 50° C. (oil bath 100° C.).

A slightly yellowish substance is obtained in a yield of 19.5 g. or 85% of theory of Nb(—O—C(CH$_3$)$_3$)$_5$.

The analysis of the very hygroscopic product shows:
Calcd. (percent): C, 52.4; H, 9.9. Found (percent): C, 50.2; H, 8.7.

The following tertiary butylates are also obtained in a similar manner:

$$Hf(O-C(CH_3)_3)_4$$
$$Mo(O-C(CH_3)_3)_6$$

EXAMPLE 8

(a) 95 g. (0.5 mol) of $TiCl_4$ are introduced into 2000 ml. (44 mols) of ethanol (anhydrous) and reacted for about one hour. A slightly yellowish clear solution is thereby produced, the temperature of which rises to about 40° C.

Thereafter, ammonia gas is passed in for 3 hours whilst cooling with icewater (0° C.). The fine white precipitate of ammonium chloride which is thereby produced is filtered off three times in a pulp-covered filter, until a clear alcoholic solution is obtained. The solvent is removed on a rotary evaporator with exclusion of atmospheric moisture. 71 g. of a white crystalline powder are obtained, corresponding to a yield of 62% of theory. The melting point of the strongly hygroscopic substance is 106° C.

(b) 34.2 g. (0.15 mol) of the product obtained as under (a) are introduced into 1330 g. (18 mols) of tert. butyl alcohol and the mixture is reacted under reflux at 77° C. for 3 hours, during the course of which the temperature of the oil bath used for heating does not exceed 115° C. Thereafter the ethyl alcohol is carefully distilled off over the course of 4 hours at 80° C. under normal pressure, and finally the reaction product is dried in vacuo at 80° C. (oil bath 115° C.).

The yield is 34 g. or 66.7% of theory.
The hygroscopic product melts at about 107° C.

EXAMPLE 9

(a) 116 g. (0.5 mol) of $ZrCl_4$ are slowly introduced into 2000 ml. (44 mols) of ethanol (anhydrous) over the course of about 15 to 20 minutes and thereafter reacted for 2 hours at 78° C. under reflux. During this reaction strong fuming occurs (HCl vapours). Thereafter ammonia gas is passed in for 45 minutes, without cooling. As soon as the reaction temperature has dropped to 25° C. the white precipitate of ammonium chloride is filtered off and is washed repeatedly with alcohol (anhydrous). The solvent is removed on a rotary evaporator, with exclusion of atmospheric moisture.

122 g. of a pale yellow powder of melting point 185° C. are obtained, corresponding to a yield of 89.9%.

(b) 27.1 g. (0.1 mol) of the product obtained as under (a) are introduced into 890 g. (12 mols) of tert.-butanol and reacted for 3 hours at 77° C. under reflux, during which time the temperature of the oil bath used for heating does not exceed 115° C. Thereafter the ethyl alcohol is distilled off at 78 to 80° C. under normal pressure over the course of 4 hours. The reaction product is dried at 80° C. in vacuo for 30 minutes.

A crystalline yellow product of melting point 105° C. is obtained. The yield is 26 g. or 68% of theory.

EXAMPLE 10

23.85 g. (0.075 mol) of niobium pentaethylate are introduced into 555 g. (75 mols) of tert.-butyl alcohol (anhydrous). Distillation of the solvents is immediately started under normal pressure at 80° C., the temperature of the oil bath used for heating not exceeding 115° C. After 3 hours the reaction is ended and the reaction product is dried for half an hour in vacuo at 30° C. (oil bath 115° C.).

The yield is 32 g. or 93% of theory. The white crystalline hygroscopic product melts at 151° C.

EXAMPLE 11

15.8 g. (0.05 mol) of $Nb(OC_2H_5)_5$ are introduced into 740 g. (10 mols) of tert.-butanol and 1260 g. (15 mols) of cyclohexane (anhydrous). Distillation of the solvents is immediately started at 70 to 74° C. under normal pressure, the temperature of the oil bath used for heating not exceeding 105° C. After 2 hours the reaction is ended. Thereafter the reaction product is dried for about half an hour in vacuo at 50 to 60° C. (oil bath 105° C.).

The yield is 21 g. or 92% of theory of a white crystalline hygroscopic product.

EXAMPLE 12

Heat-resistant paint

The following preparation is used for spraying metal surfaces:

40 parts of titanium tert.-butylate
60 parts of aluminum paste
20–25 parts of mineral oil thinner (white spirit).

The titanium tert.-butylate is slowly mixed with the pigment and the mixture is subsequently diluted to the desired consistency. Metal surfaces are sprayed with this preparation and the procedure is such that the paint is liquid when it strikes the metal surface. If desired, hot metal surfaces can also be sprayed.

The film obtained on the metal surface shows a distinct improvement as regards hardness and adhesion when compared to films which are obtained with preparations without titanium tert.-butylate.

Instead of the said titanium tert.-butylate, the other tert.-butylates described in the preceding examples can also be used.

I claim:
1. A process for the manufacture of a tertiary butylate of niobium$^V$, tantalum$^V$, or tungsten$^{VI}$ which comprises heating 1 mol of a metal alcoholate of formula

$$Me(O-R)_n$$

wherein Me, denotes niobium$^V$, tantalum$^V$, or tungsten$^{VI}$ and $n$ denotes 5 or 6, corresponding to the valency of the metal and R is an alkyl radical of 1 to 3 carbon atoms, with at least $20n$ mols of tertiary butanol, and slowly distilling off the solvent and all volatile constituents.

2. Process according to claim 1, wherein R denotes methyl or ethyl.

3. Process according to claim 1, which comprises $20n$ to $80n$, mols of tert.-butanol per 1 mol of metal alcoholate.

4. Process according to claim 3 which comprises $20n$ to $40n$, mols of tert.-butanol per 1 mol of metal alcoholate.

5. Process according to claim 2, which comprises $20n_1$ to $80n$ mols of tert.-butanol per 1 mol of metal alcoholate.

6. Process according to claim 5, which comprises $20n_1$ to $40n$ mols of tert.-butanol per 1 mol of metal alcoholate.

7. A process for the manufacture of a tertiary butylate of molybdenum$^{VI}$ which comprises heating 1 mol of molybdenum alcoholate of formula $$Mo(O-R)_6$$

wherein R is an alkyl radical of 1 to 3 carbon atoms, with at least 120 mols of tertiary butanol, and slowly distilling off the solvent and removing all volatile constituents.

8. A process according to claim 7, wherein 120 to 480 mols of tert.-butanol per mol of molybdenum alcoholate is used.

9. A process according to claim 8, wherein 120 to 240 mols of tert.-butanol per mol of molybdenum alcoholate is used.

References Cited

UNITED STATES PATENTS 3,268,566  8/1966  Stanley et al. _____ 260—42.95

OTHER REFERENCES

Bradley: Progress in Inorganic Chemistry, vol. 2, 1960, Interscience Publishers, New York, N.Y., pp. 308–317.

Bradley et al.: J. Chem. Soc., 1952, pp. 4204–9.

Speer: J. Org. Chem., vol. 14 (1949), pp. 655–658.

Bischoff et al.: J. Am. Chem. Soc., 46 (1924), pp. 256–9.

DANIEL E. WYMAN, Primary Examiner

A. P. DEMERS, Assistant Examiner

U.S. Cl. X.R.

106—290, 299; 252—431 R; 260—429.3, 429.5, 438.5 R

UNITED STATES PATENT OFFICE
CERTIFICATE OF CORRECTION

Patent No. 3,772,355          Dated November 13, 1973

Inventor(s) JUERG MERZ

It is certified that error appears in the above-identified patent and that said Letters Patent are hereby corrected as shown below:

Column 6, claim 5, line 60, change "$20n_1$" to -- $20n$ --.

Column 6, claim 6, line 63, change "$20n_1$" to -- $20n$ --.

Signed and sealed this 9th day of April 1974.

(SEAL)
Attest:

EDWARD M. FLETCHER, JR.          C. MARSHALL DANN
Attesting Officer                Commissioner of Patents